(12) United States Patent
Brown et al.

(10) Patent No.: US 10,114,127 B2
(45) Date of Patent: Oct. 30, 2018

(54) AUGMENTED REALITY VISUALIZATION SYSTEM

(71) Applicant: The United States of America as represented by the Secretary of the Navy, Washington, DC (US)

(72) Inventors: Christopher A Brown, Bloomington, IN (US); Matthew Juhl, Springville, IN (US)

(73) Assignee: The United States of America, as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 15/152,533

(22) Filed: May 11, 2016

(65) Prior Publication Data
US 2016/0379414 A1 Dec. 29, 2016

Related U.S. Application Data

(60) Provisional application No. 62/159,522, filed on May 11, 2015.

(51) Int. Cl.
*G06T 19/00* (2011.01)
*G01S 19/53* (2010.01)
(Continued)

(52) U.S. Cl.
CPC .............. *G01S 19/53* (2013.01); *F41G 3/02* (2013.01); *F41G 3/06* (2013.01); *F41G 3/142* (2013.01);
(Continued)

(58) Field of Classification Search
CPC .................................................. G06T 19/006
(Continued)

(56) References Cited

U.S. PATENT DOCUMENTS 5,641,288 A * 6/1997 Zaenglein, Jr. ....... F41G 3/2633
434/17
5,645,077 A * 7/1997 Foxlin ................... A61B 5/1114
600/587

(Continued)

OTHER PUBLICATIONS

Photogrammetry—Wikipedia, May 11, 2016; https://en.wikipedia.org/wiki/Photogrammetry, 6 pages.
(Continued)

*Primary Examiner* — Javid A Amini
(74) *Attorney, Agent, or Firm* — Christopher A. Monsey

(57) ABSTRACT

An augmented reality (AR) system comprising a head mounted display (HMD) configured to display one or more AR visualizations within an operator's field of view (FOV), a control system including a processor and a storage system configured to store machine readable instructions, sensors configured to determine at least location and/or orientation of said sensors including a head mounted and device mounted sensor, and a communication system configured to communicate data between elements of the AR system. The software including various subroutines or machine readable instructions including an orientation/location instructions for determining orientation and/or position of the sensors, a visualizations generation instructions section configured to generate a visualization showing an aim point of a device coupled to said device mounted sensor, a path of travel of a projectile launched from said device, or an impact point of said projectile. Embodiments can include one or more photogrammetry processing sections.

14 Claims, 7 Drawing Sheets

(51) Int. Cl.
*G01S 19/47* (2010.01)
*G06F 3/0484* (2013.01)
*G02B 27/01* (2006.01)
*F41G 3/02* (2006.01)
*F41G 3/06* (2006.01)
*F41G 3/14* (2006.01)
*F41G 3/16* (2006.01)
*G06F 1/16* (2006.01)
*G06F 3/01* (2006.01)

(52) U.S. Cl.
CPC .............. *F41G 3/165* (2013.01); *G01S 19/47* (2013.01); *G02B 27/017* (2013.01); *G02B 27/0172* (2013.01); *G02B 27/0179* (2013.01); *G02B 27/0189* (2013.01); *G06F 1/163* (2013.01); *G06F 3/011* (2013.01); *G06F 3/04842* (2013.01); *G02B 2027/014* (2013.01); *G02B 2027/0138* (2013.01)

(58) Field of Classification Search
USPC ........................................................ 345/633
See application file for complete search history.

(56) References Cited

U.S. PATENT DOCUMENTS

| | | | | |
|---|---|---|---|---|
| 5,740,037 A * | 4/1998 | McCann | ................ | F41G 3/165 700/90 |
| 5,864,481 A * | 1/1999 | Gross | ..................... | G06F 1/163 361/679.03 |
| 6,050,822 A * | 4/2000 | Faughn | ................... | G06F 3/011 345/952 |
| 6,556,196 B1 * | 4/2003 | Blanz | ................. | G06K 9/00275 345/419 |
| 7,301,648 B2 * | 11/2007 | Foxlin | ................. | G02B 27/017 356/620 |
| 8,401,248 B1 * | 3/2013 | Moon | ................ | G06Q 30/0242 382/103 |
| 8,678,282 B1 * | 3/2014 | Black | ...................... | F41G 3/16 235/13 |
| 9,691,221 B2 * | 6/2017 | Block | ................. | G07F 17/3239 |
| 2003/0098972 A1 * | 5/2003 | McMillan | ............ | G01B 11/272 356/139.03 |
| 2006/0284792 A1 * | 12/2006 | Foxlin | .................. | G02B 27/017 345/8 |
| 2008/0253664 A1 * | 10/2008 | Li | ..................... | G06K 9/00228 382/226 |
| 2008/0266254 A1 * | 10/2008 | Robbins | ............... | G05D 1/0016 345/161 |
| 2009/0040308 A1 * | 2/2009 | Temovskiy | ........ | G02B 27/0068 348/158 |
| 2009/0112469 A1 * | 4/2009 | Lapidot | .................. | G01C 23/00 701/469 |
| 2010/0312734 A1 * | 12/2010 | Widrow | ............... | G06K 9/6247 706/25 |
| 2011/0031928 A1 * | 2/2011 | Soar | ......................... | F41G 1/34 320/108 |
| 2011/0289810 A1 * | 12/2011 | D'Souza | .................. | F41G 1/38 42/1.01 |
| 2012/0068913 A1 * | 3/2012 | Bar-Zeev | ............. | G02B 26/026 345/8 |
| 2012/0274922 A1 * | 11/2012 | Hodge | ........................ | F41J 5/02 356/28 |
| 2014/0023995 A1 * | 1/2014 | Jones | ...................... | G09B 9/003 434/11 |
| 2015/0070813 A1 * | 3/2015 | Knapp | ................. | F41H 13/0018 361/232 |
| 2015/0338723 A1 * | 11/2015 | Duncan | ................ | H04N 5/2252 348/373 |
| 2016/0225192 A1 * | 8/2016 | Jones | ...................... | G06F 3/012 |
| 2016/0234232 A1 * | 8/2016 | Poder | ................. | H04L 63/1425 |
| 2017/0344114 A1 * | 11/2017 | Osterhout | ............... | G06F 3/017 |

OTHER PUBLICATIONS

Augmented Reality Glasses are Coming to the Battlefield, Popular Science; posted Apr. 22, 2015 by Andrew Rosenblum; http://www.popsci.com/experiemental-ar-glasses-offer-marines-hands-free-intel, 3 pages.
Cartography—Springer; http://link.springer.com/referenceworkentry/10.1007/878-3-642-27793-1 . . . May 11, 2016, 3 pages.

* cited by examiner

AUGMENTED REALITY VISUALIZATION SYSTEM

CROSS-REFERENCE TO RELATED APPLICATIONS

The present application claims priority to U.S. Provisional Patent Application Ser. No. 62/159,522, filed May 11, 2015, entitled "Augmented Reality Visualization System," the disclosure of which is expressly incorporated by reference herein

STATEMENT REGARDING FEDERALLY SPONSORED RESEARCH OR DEVELOPMENT

The invention described herein was made in the performance of official duties by employees of the Department of the Navy and may be manufactured, used and licensed by or for the United States Government for any governmental purpose without payment of any royalties thereon. This invention (Navy Case 200,238) is assigned to the United States Government and is available for licensing for commercial purposes. Licensing and technical inquiries may be directed to the Technology Transfer Office, Naval Surface Warfare Center Crane, email: Cran_CTO@navy.mil

BACKGROUND AND SUMMARY OF THE INVENTION

The present invention relates to an augmented reality (AR) system to generate visualizations used in relation to correlating geo-reference locations associated with one or more devices. Further aspects of the invention include various control systems, software, sensors, and AR visualization systems used with regard to head mounted displays (HMD) to generate visualizations as used by a human operator to increase an ability of an operator to interact with an environment or system such as a firearm or another product dispensing system that uses a variety of product output application paths or approaches.

A variety of shortcomings are present in existing systems. For example, a targeting system could provide a target with indicators or knowledge that they are being targeted. This can result in an unintended escalation of force prior to the employment of the associated device and/or the ability to employ defensive techniques reducing the effectiveness of the associated device. Other systems do not provide an effective understanding to an operator of a particular area which will be affected or impacted by a product dispensing system which creates potential for an unwanted or undesired application of output from the product dispensing system.

At least some exemplary embodiments can include an augmented reality (AR) system comprising a head mounted display (HMD) configured to display one or more AR visualizations within an operator's field of view (FOV), a control system including a processor and a storage system configured to store machine readable instructions, sensors configured to determine at least location and/or orientation of said sensors including a head mounted sensor and device mounted sensor, and a communication system configured to communicate data between elements of the AR system. The control system can include machine readable instructions such as software including various subroutines including an orientation/location instructions for determining orientation and/or position of the sensors, photogrammetry system, a wire model generating system that generates the wire model using a camera, e.g. a HMD camera, a visualizations generation instructions section that is coupled to said device mounted sensor configured to generate a visualization showing an aim point of a product dispensing device on a surface or portion of the wire frame model which includes one or more entities or objects, a path of travel of a projectile launched from said device, or an impact point of said projectile or product on the surface or portion of the wire frame model. Embodiments can include control sections or processing sections that integrate photogrammetry with video overlays for a variety of applications including direct application of product dispensing devices, e.g., projectile launcher outputs, or indirect applications such as outputs from dispensing devices which travel an indirect path such as a ballistic trajectory or another indirect or relatively less direct path.

Additional features and advantages of the present invention will become apparent to those skilled in the art upon consideration of the following detailed description of the illustrative embodiment exemplifying the best mode of carrying out the invention as presently perceived.

BRIEF DESCRIPTION OF THE DRAWINGS

The detailed description of the drawings particularly refers to the accompanying figures in which.

DETAILED DESCRIPTION OF THE DRAWINGS

The embodiments of the invention described herein are not intended to be exhaustive or to limit the invention to precise forms disclosed. Rather, the embodiments selected for description have been chosen to enable one skilled in the art to practice the invention.

Figure 1:
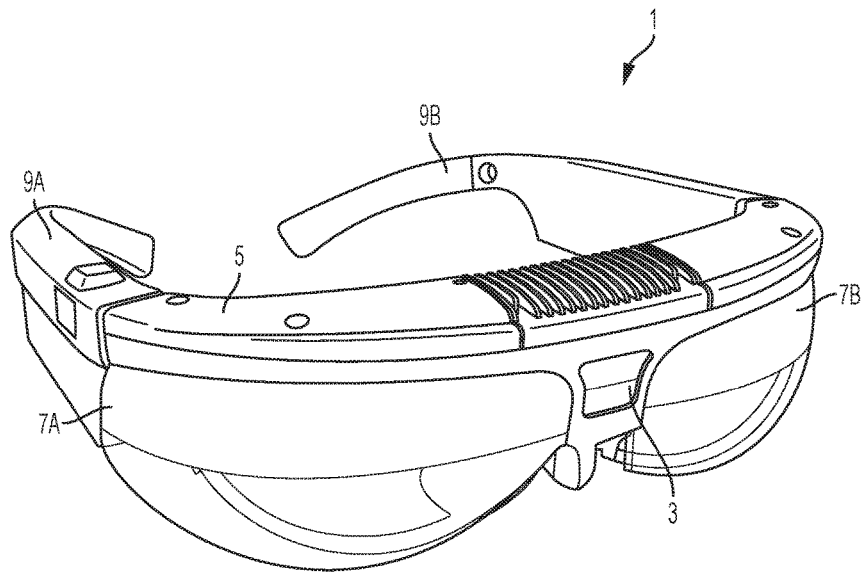
FIG. 1 shows one example of an AR HMD system that can be used with various embodiments s of the invention.
Figure 2:
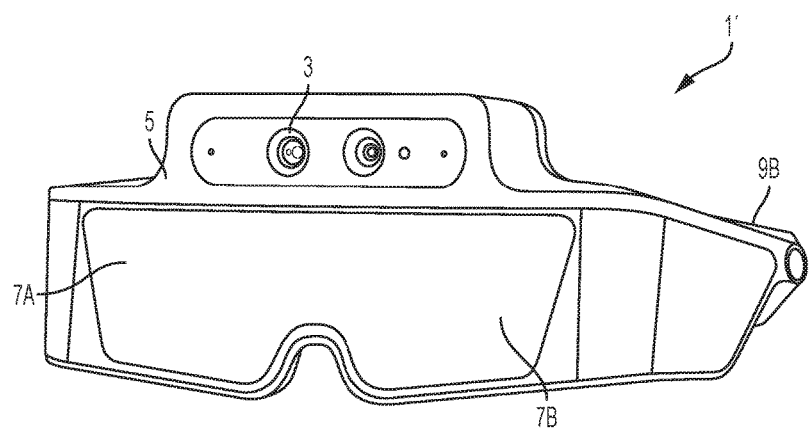
FIG. 2 shows another example of an AR HMD system that can be used with various embodiments of the invention.

Referring initially to FIG. 1, one example of an AR HMD system 1 is shown that can be used with various embodiments of the invention. Various components are included in the AR HMD system 1 including a camera 3 positioned on the HMD headpiece 5, visual displays positioned relative to a viewing angle of an AR HMD wearer (not shown but on reverse side optics or lenses 7A, 7B), and a coupling structure (e.g., head coupling structure comprising earpieces 9A, 9B) adapted to position and hold the AR HMD system 1 in relation to a user's field of view (FOV). A transceiver or transmitter/receiver (not shown) is also incorporated into the AR HMD system 1 that is configured to communicate data, (e.g. visual data signals, data representations, inputs (i.e. sound inputs from a microphone (not shown)) etc.), with other elements of the invention or other systems. FIG. 2 shows another example of an AR HMD system 1' that can be used with various embodiments of the invention with similar components such as shown in FIG. 1.

Embodiments of the exemplary AR HMD system 1 can permit viewing through lenses 7A, 7B of the AR HMD system 1 with a visual overlay or they can be designed to selectively block out light coming through the lenses and thus create an AR visualization that shows a concurrent video image that is received from the AR HMD forward facing camera 3. An alternate mode can include a wide angle lens or a panoramic lens (up to 360 degree) camera which creates a panoramic view in the AR HMD system 1 that can be scaled to show more than a forward facing FOV using various elements such as an AR interface that functions by permitting selection of elements of the AR GUI and dragging or selecting a wider or narrower FOV such as using AR glove or voice commands (e.g., using an AR glove or GUI system that can include a switch or a motion on a particular AR GUI visualization or overlay element) to move a FOV selection frame. AR GUI software can be incorporated into an embodiment to execute various functions that can include machine code operable to place a cursor on an exemplary AR HMD visualization or overlay which can be manipulated or moved by a cursor control software module or subroutine which controls a graphics card or software which tracks coordinate positions of the cursor. An exemplary AR GUI system can include a software subroutine which track a location of a cursor control hardware such as an AR glove using, e.g., a software section that operates with an inertial navigation unit (INU) positioned on a user (or within the AR HMD system 1) that can include elements such as accelerometers and gyroscopes including versions implemented with microelectronic variants such as solid state systems. The exemplary INU system can be controlled by a spatial mapping software subroutine which creates an INU three dimensional (3D) model and data structure with 3D coordinate systems. One example can include a system which aligns the INU/3D model by having a control section or software routine which permits a user to initially align the system by moving the cursor after selecting an align and/or correlation function in a variety of ways (e.g., a button on an external device such as a belt mounted or HMD mounted, etc.; an AR HMD visualization GUI element that can be selected; a voice activated selection, etc.). Once the initial alignment function is selected, a user can move the cursor control hardware unit to an alignment element in the AR HMD visualization GUI then activate a selection control that informs the INU/3D model that the cursor control hardware and the AR HMD visualization GUI are now in alignment. Subsequent movements can be updated by INU elements (e.g. 3 axis accelerometers of the INU), which then update the INU/3D model so to permit update of position of the cursor on the AR HMD visualization GUI to correlate to actual positions of the cursor hardware control unit. A switch on the hardware control unit or motions and/or a combination of motion and verbal commands can be used by software to execute interactions between the cursor control hardware unit (e.g., a glove, a finger on a glove, etc.), and the AR system including the AR HMD visualization GUI. Software also is provided which provides other functionality such as selection of elements shown on the AR HMD visualization GUI (e.g. specific objects), to include shape recognition and correlation, designated actions associated with a displayed/recognized/selected object or shape (e.g. tag for tracking, information display, specific actions including arrest/track/issue control commands to, flash warnings associated with a selected object, update status associated with a selected/recognized object or shape, etc.). A device mounted position sensor (DMPS) as well as a position sensor coupled with the HMD (a head mounted position sensor or HMPS) can also be used which communicates with a position sensor receiver (PSR) which coordinates movement of a device (e.g. a weapon or unmanned aerial vehicle (UAV)/remotely piloted vehicle (RPV), etc.) with the AR HMD visualization GUI.

Figure 3:
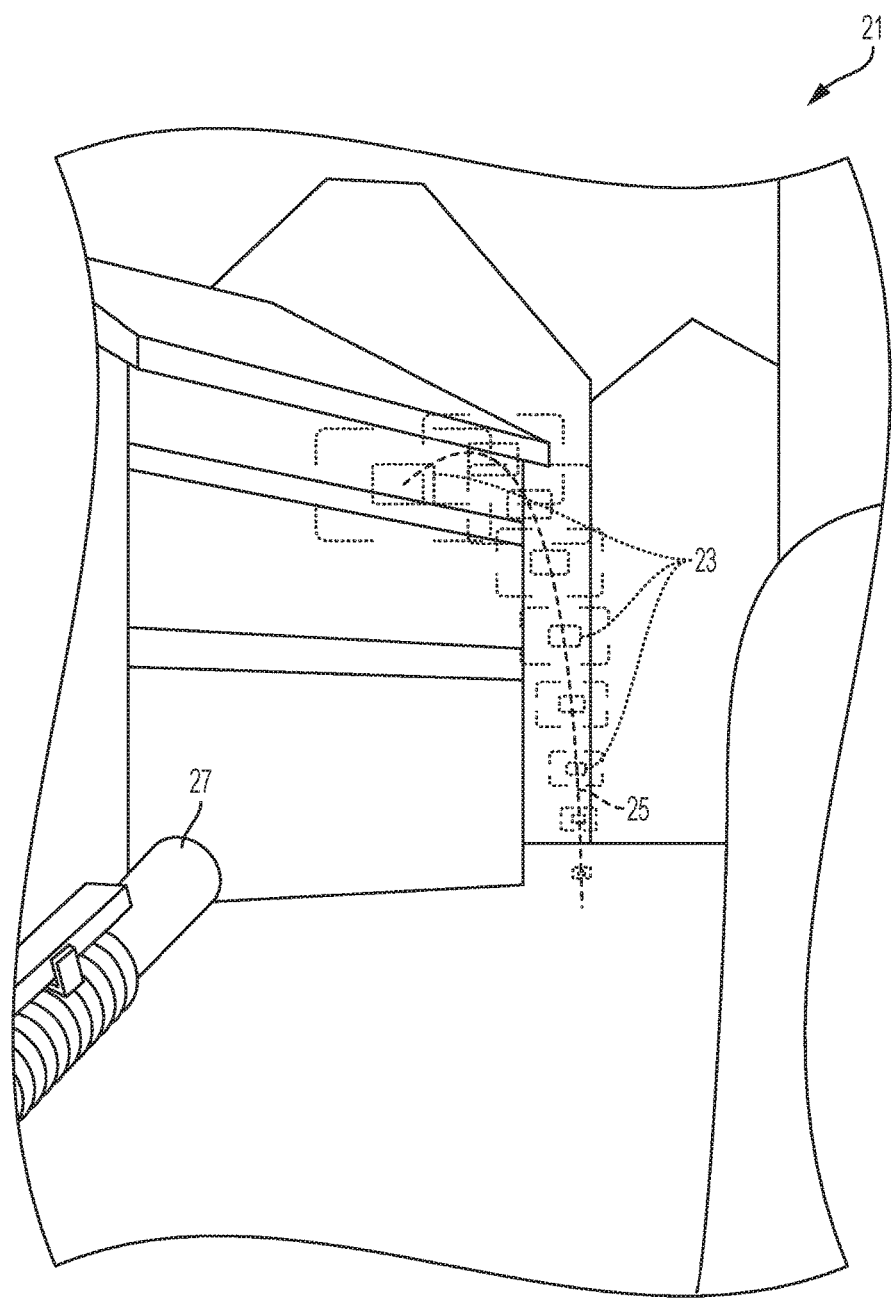
FIG. 3 shows one exemplary AR HMD graphical user interface (GUI) in accordance with one embodiment of the invention.

FIG. 3 shows one exemplary AR HMD visualization GUI 21 in accordance with one embodiment of the invention. The FIG. 3 AR HMD visualization GUI 21 shows a background that can be viewed directly through a HMD or an image or video capture from a camera (e.g., 3) mounted in relationship to the AR HMD visualization GUI 21. A movement track 23 is shown that displays a movement path of a projectile or alternatively a moveable object (e.g. RPV UAV (not shown)) with a strike point or a landing location 25. The movement track is updated as a point of origin (e.g. muzzle for a weapon 27) for a projectile launcher or moveable object changes. Designated impact points or landing locations can be selected manually by data input, data link/net data transfers, or via the AR HMD visualization GUI and cursor control hardware (not shown) such as described above with regard to selection of a designated action which is captured and stored by a control system that can be carried by a human operator, on an exo-skeleton (not shown) that a human operator operates, or a robotic system (not shown) that an embodiment of the invention is mounted upon.

Figure 4:
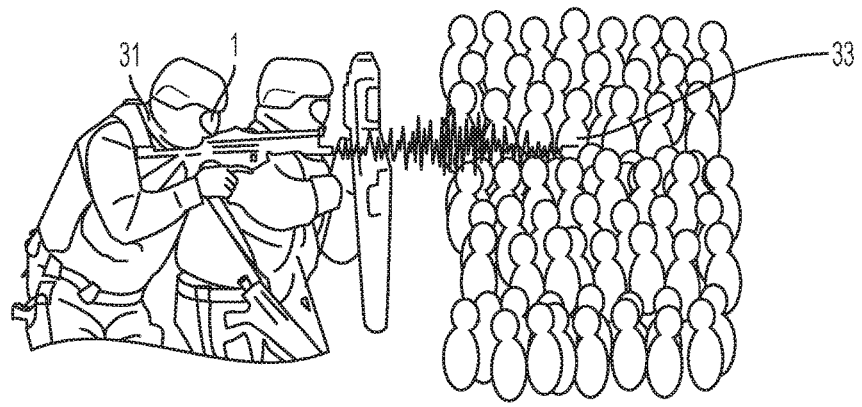
FIG. 4 shows one exemplary employment of an AR system with various embodiments of the invention.

FIG. 4 shows one exemplary employment of an AR HMD system 1 with various embodiments of the invention. The FIG. 4 embodiment shows two human operators 31, one or both having an embodiment of the invention (e.g., 1) worn, which shows them targeting a specific individual 33 in a crowd based on information displayed on their AR HMD visualization GUI (not shown).

Figure 5:
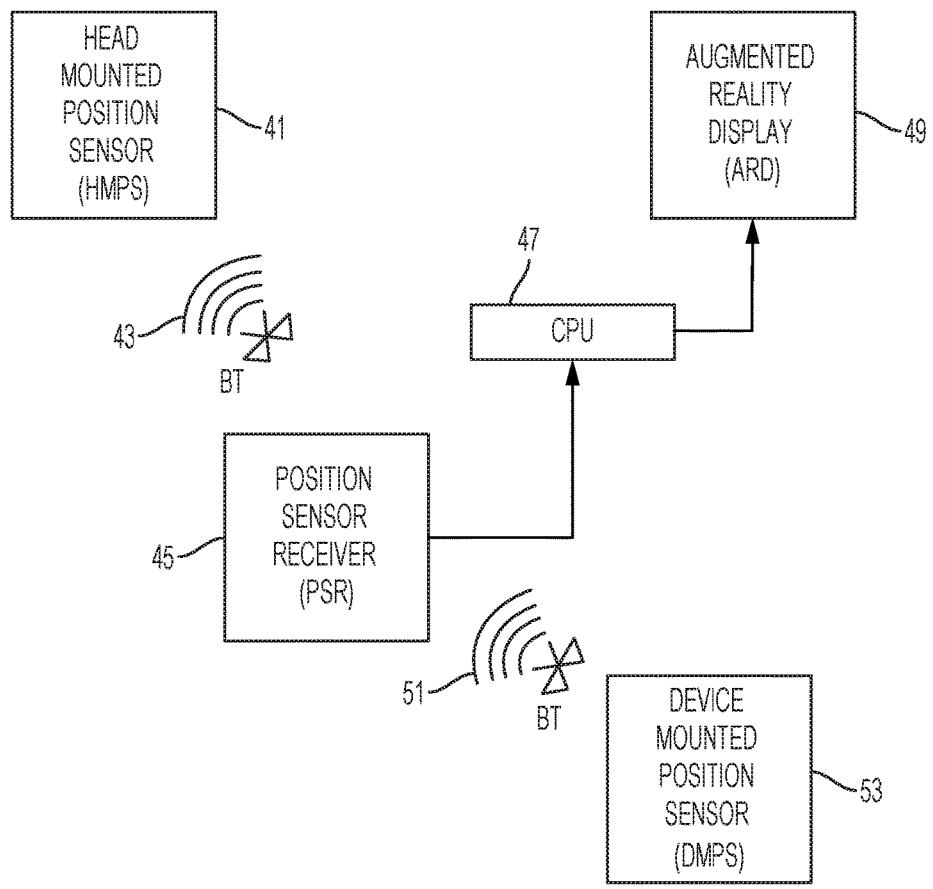
FIG. 5 shows a simplified hardware architecture in accordance with one embodiment of the invention.

FIG. 5 shows the simplified hardware architecture in accordance with one embodiment of the invention. In particular, a HMPS 41, a position sensor receiver (PSR) 45, a control system including a central processing unit (CPU) 47 and a software storage system (not shown but coupled with the CPU), a DMPS 53, an AR Display (ARD) system 49 displays information associated with an operator's HMD (e.g., see FIG. 1) and a device that the DMPS 53 is coupled with. An additional system (not shown) can be mounted on the DMPS 53 that includes a library of data associated with the device that the DMPS 53 is coupled with such as capability accessory systems that can be operated in relation to the device (e.g., a projectile system fired from the device) such as range, type of munition loaded, expected range, targeting information (e.g. range from a laser range finder, etc.). Embodiments of the DMPS 53 can provide location information and orientation of a device the DMPS 53 is coupled with. Embodiments can use various sensors (not shown) and sensor data to determine the aim point of the device (e.g. a hand held acoustic hailing device). Such sensors can include sensors for collecting or measuring pitch, yaw, roll, range, global position system (GPS) location, etc. Additionally, embodiments of an exemplary system can track device position and orientation relative to the user's sight line and FOV. Wireless systems or wired systems 43, 51 (e.g., Bluetooth®) can be used to couple elements of the system together.

Embodiments of the system can also include a transmitter/receiver for enabling a data link system that operates on a variety of wavelengths including various types of radio frequency (RF) systems or a laser communication data transfer system that permits line of sight (LOS) interfaces to reduce a probability of detection of the operator or transmitter activity. The transmitter can be configured to transmit location of a target. Additional machine readable instructions can be provided that will place a target location on one visualization embodiment so as to permit an operator to move an aim point or a projected impact point of a projectile fired from a projectile firing system over the target location. An embodiment of the invention can further include machine readable instructions which create an additional visualization indication when projected aim or impact point corresponds to the visualization of the target location overlaid over a video image of the operator's HMD FOV.

Figure 6:
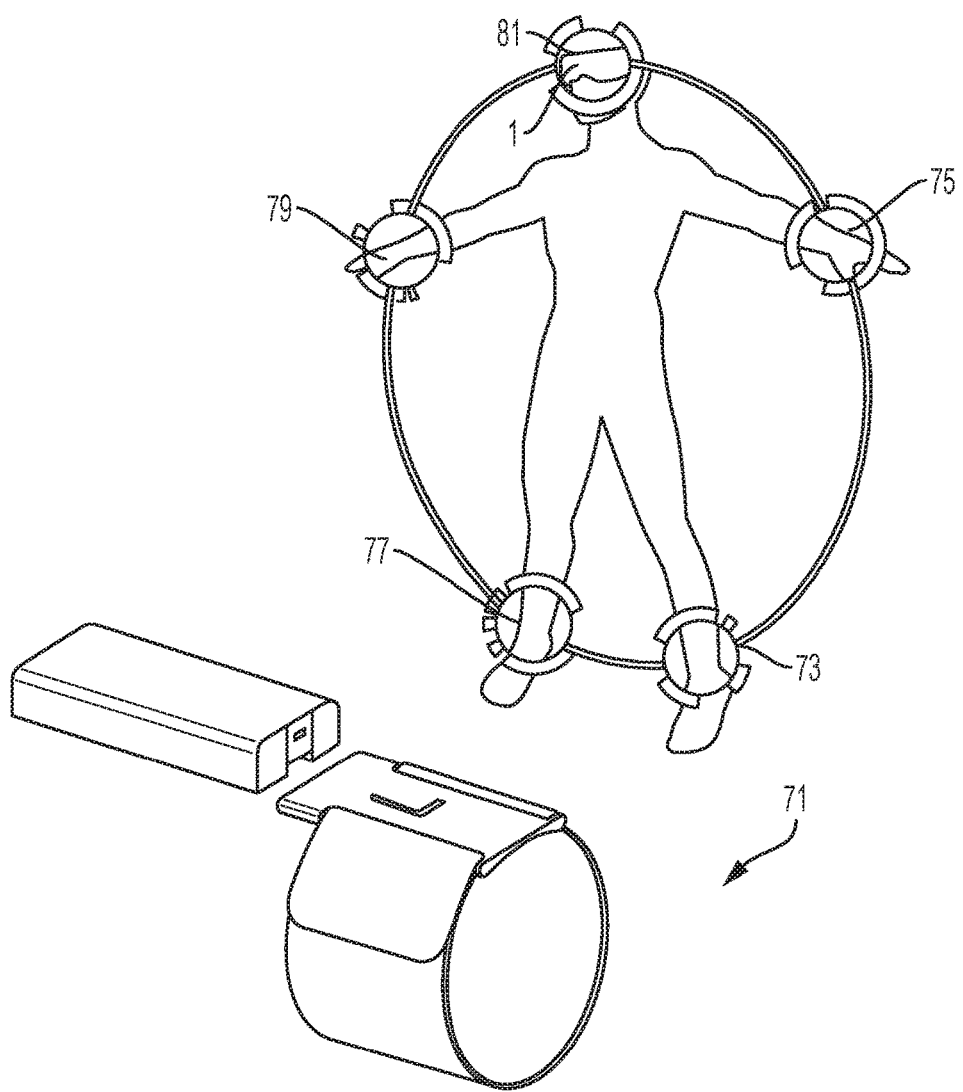
FIG. 6 shows an exemplary relationship between various wearable AR systems on a human frame in accordance with one embodiment of the invention.

FIG. 6 shows an exemplary relationship between various wearable AR systems 71 (e.g. position sensors including a PSR or other type of relative position sensor with transmitter/receiver) on a human frame in accordance with one embodiment of the invention. Individual position sensors 73, 75, 77, 79, 81 coupled to points on the human frame (or for a device or one or more devices (not shown), mounted to the one or more devices), and/or a HMD (e.g. 1) or head of a user (e.g. head of the human frame) that can be used to determine relative positioning of the human frame elements, dispensing device(s) (e.g., projectile launcher) the position sensor(s) are mounted to (not shown), and/or the HMD (e.g., 1) or even a human head with a correlated user eye orientation including with respect to a reference plane (e.g. earth surface or geo-reference model). Embodiments of the invention can provide data regarding the/a dispensing device's (not shown) (e.g. projectile launcher) aiming sight lines and point of aim/actual impact point correlated with output from the dispensing device at a given orientation. A position device (e.g. PSR which can be an INU or IMU) can provide 3D space location of a human frame element or the dispensing device (not shown), the position sensor (e.g. PSR) is mounted to a human head (with HMD, e.g., 1) with respect to each other. An embodiment can include a system (not shown) which creates a wire frame data model of the dispensing device along with offsets between the position sensor (e.g. PSR) mounting location and a specific point (muzzle or output point) associated with the dispensing device that the position sensor (e.g. PSR) is mounted on. For example, a position sensor (e.g. PSR) can be mounted six inches behind a dispensing device output point or muzzle and one inch below. In this example then, a 3D model and offset of the PSR location to the muzzle location and axis of travel for a projectile through a projectile firing system associated with the output point or muzzle can be based on differences between the PSR and critical elements of the dispensing device such as output product's axis of travel (initial vector of, e.g. a projectile exiting the dispensing or firing system) and output point or muzzle location. Embodiments can also include electromagnetic motion tracking sensors used to track location of a given dispensing device associated with a motion tracking sensor.

Figure 7:
FIG. 7 shows an additional AR HMD GUI showing an AR visualization viewed on the HMD showing a particular individual in a crowd highlighted or designated for surveillance or further action.

FIG. 7 shows an additional AR HMD target of interest tracking GUI 101 showing an AR visualization viewed on an exemplary HMD (e.g., 1) which is showing a particular individual 103 in a crowd highlighted or designated for surveillance or further action. This figure shows how a user can select a member of a crowd using an exemplary AR HMD visualization GUI (e.g., 101) and cursor control hardware (not shown) to tag a person for tracking using shape recognition software (not shown but can be local and coupled to the HMD 1 or remote and interacting remotely with the HMD 1). Optionally, an additional system (not shown) can be added for remote geo-sensing of a selected target (e.g. a particular individual 103 shown in FIG. 7) which provides a specific geo reference (not shown) such as using a laser range finder to identify range to a selected object as well as a system that then translates a 3D model of HMD location to a selected object based on angle of a laser range finder in relation to a georeferenced plane to the selected object and known location of the HMD plus distance to the selected object. A laser range finder can be optionally added into the HMD or carried as a separate device with its own PSR which would include orientation and location with respect to a reference plane.

Figure 8:
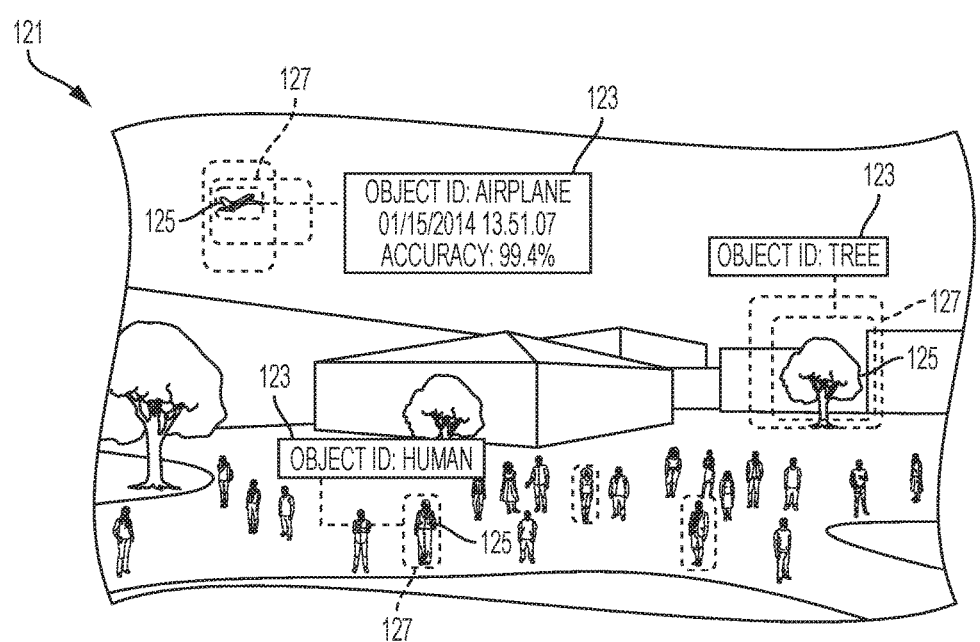
FIG. 8 shows an additional AR HMD GUI showing an AR visualization with various elements or objects identified along with metadata for the various objects.

FIG. 8 shows an additional AR HMD of an environment and entities overlay AR HMD visualization GUI 121 showing an AR visualization with various entities 125 (e.g. elements or objects) identified along with metadata 123 for the various entities, elements or objects 125. Different entities 125 are shown (e.g. airplane, tree, humans, etc.) with selection boxes 127 surrounding them in the AR HMD visualization GUI 121. Data associated with each selected entity 125 is displayed next to the selected entity 125 which provides information associated with each entity (e.g. aircraft), accuracy of object recognition, identifier associated with the entity, etc.

Figure 9:
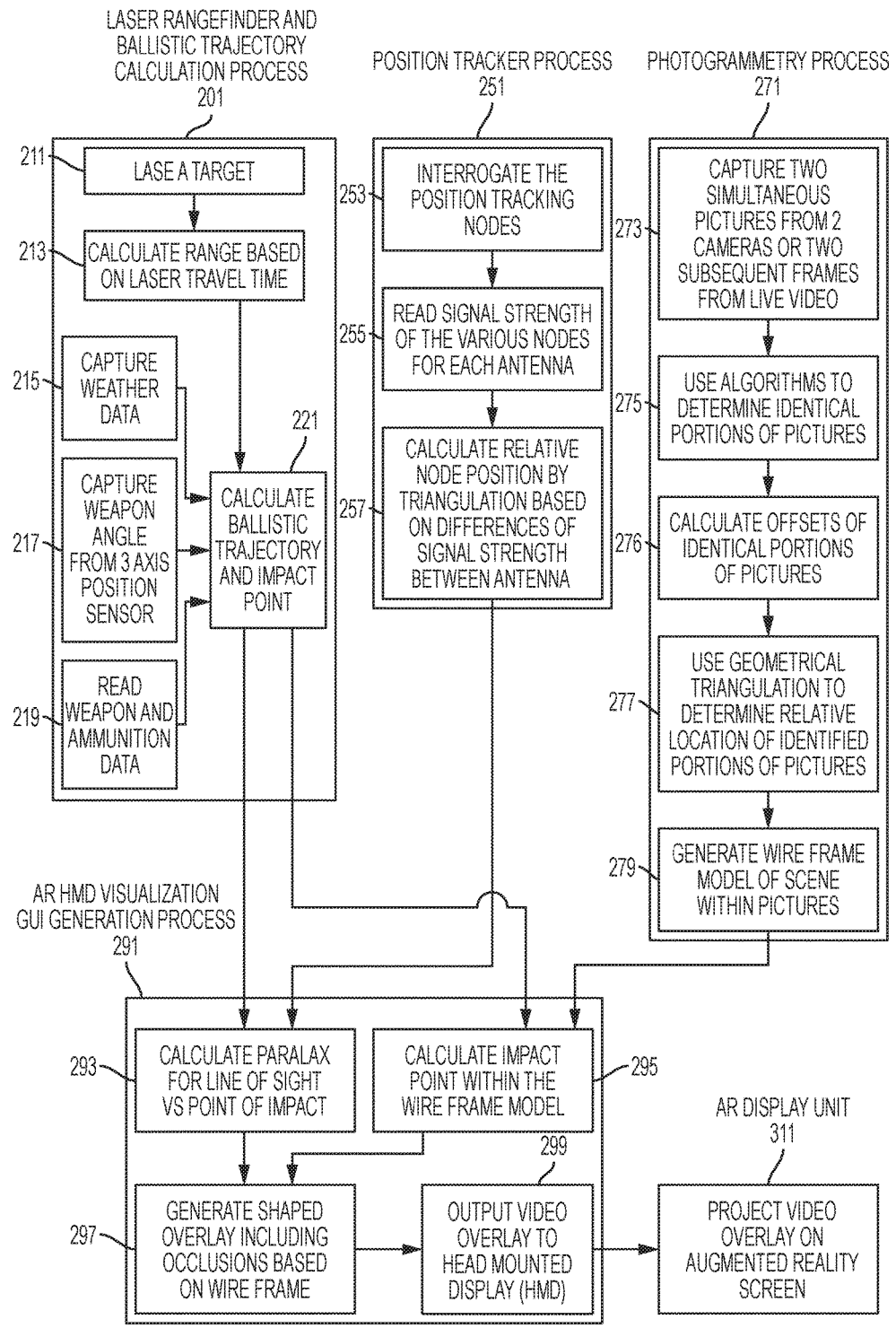
FIG. 9 shows an exemplary set of processes for operating various components of an embodiment or embodiments of the invention.

FIG. 9 shows an exemplary set of processes for operating various components of an embodiment or embodiments of the invention. In this embodiment, three major activities or processes and system operations are executed near concurrently or concurrently comprising operations associated with a laser rangefinder and ballistic trajectory calculation process 201, a position tracker process 251, and a photogrammetry process 271 which feed outputs into a AR HMD visualization GUI generation process 291 which is in turn followed by a display process for displaying the AR HMD visualization GUI on an AR HMD (or device mounted system). At processing step 211 a user can lase a target with a laser rangefinder or designator. At step 213, the laser rangefinder or designator (or a system coupled to the laser rangefinder or designator) calculates range based on laser travel time. At step 215, weather data is captured from a local source or a remote source via a communication link either automatically upon activation of the laser range finder or designator or upon user inputs. At step 217, dispensing or firing device (e.g. weapon, launcher, item or product dispenser, projectile launcher, tear gas canister firing system, crop duster system, etc.) orientation or dispensing delivery system axis is determined from a three axis position sensor. At step 219, dispensing or firing device is polled for data associated with its dispensing or firing function (e.g. read weapon and ammunition data). At step 221, a computation system calculates ballistic trajectory of products or output from the dispensing or firing device and impact point receiving outputs from step 213, 215, 217, and 219. Processing within position tracker process group 251 starts with step 253 with interrogating position tracking nodes. At step 255, reading signal strength of various nodes for each position tracking system (e.g. a PSR) and associated antenna. At step 257, calculate relative node position by triangulation based on differences of signal strength between each position sensor or tracker antenna, e.g. PSR antenna. The photogrammetry process group 271 can begin at step 273 with capture of two simultaneous images or pictures from two cameras or two subsequent frames from a video camera or live video system (e.g., camera 3). At step 275, a video processing system can use processing or control logic (e.g., video processing software or algorithms) to determine identical portions of the images or pictures captured at step 273. At step 276, calculate offsets from identical portions of the images or pictures using the video processing system. At step 277, determining relative location of identical portions of the images or pictures using the video processing system based on geometrical triangulation of the relative locations. At step 279, generating a wire frame model or models of a scene within the images or pictures comprising at least objects, entities, surfaces, or structures including the identical portions. The AR HMD visualization GUI generation process group 291 exemplary embodiment commences processes or operation receives outputs from step 221 and 257 while step 295 receives outputs from step 221 and 279 where at step 293 processing system including a CPU calculates parallax for line of sight vs point of impact for dispensing device output(s) while at step 295 the processing system including the CPU calculates one or more impact or dispensing points within or on the wire frame model produced at step 279. At step 297, outputs from step 293 and 295 are received and the processing system generates a shaped video overlay model data including occlusions, dispensing object drop points, or dispensing object impacts on the wire frame model to produce the AR HMD visualization GUI comprising a plurality of video frame overlays that are positionally correlated with the entities or objects in the images or pictures as well as the occlusions, dispensing object drop points or dispensing object impact points on the wire frame model. At step 299, AR HMD visualization GUI is output to the AR HMD system (e.g. 1) which is received by the AR HMD at step 311. At step 311, the AR HMD receives the AR HMD visualization GUI which projects the AR HMD visualization GUI or video overlays on the AR HMD's display within user's line of sight.

Figure 10:
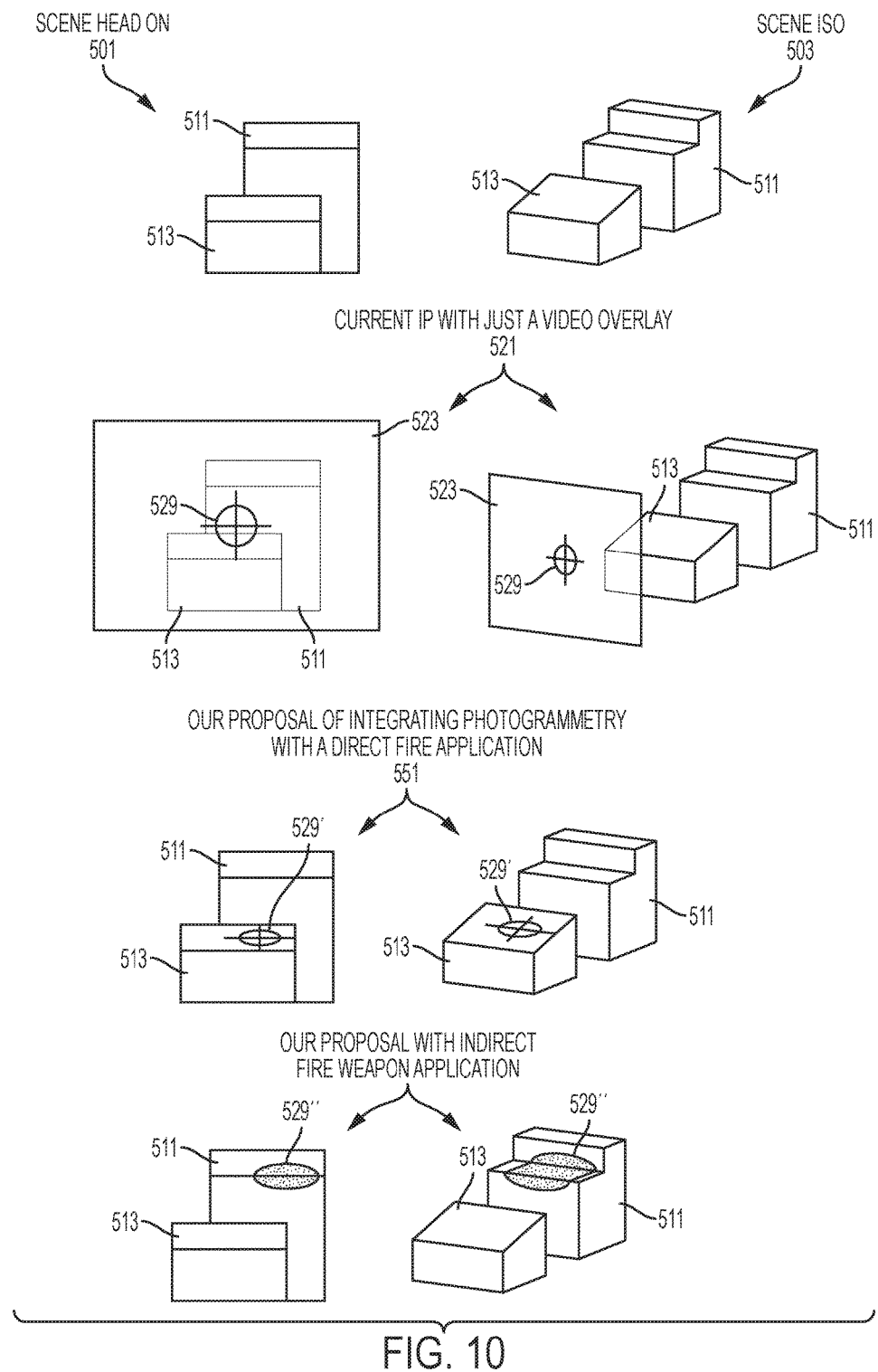
FIG. 10 shows a progressive set of simplified views of wire frame models with a simplified video overlay then various video overlays based on photogrammetry for multiple applications including direct and indirect application of various product dispensing systems.

FIG. 10 shows a simplified representation of wire frame data models comparing head on scenes with isometric scenes, then with the wire frame models with just a video overlay, then with the video overlay integrating photogrammetry with different applications such as direct fire dispensing system output application (e.g., firearm or projectile launcher) as well as another application such as an indirect fire dispensing system output application (e.g., a wide dispersion application such as water from firefighting, tear gas, mortar fire, fragmentation grenade, etc.). The first section of FIG. 10 shows a simplified head on 501 view as well as an isometric view 503 of several objects or entities 511, 513 rendered in wire frame model(s). The second section of FIG. 10 shows the head on view 501 as well as the isometric view 503 with a simple video overlay plane 523 with a current or predicted impact point (IP) 529 disposed on the simple video overlay plane 523 oriented in a FOV over one or more of the objects or entities 511, 513 on their wire frame models. The third section of FIG. 10 shows integrating and projecting the current or predicted IP 529' to conform the IP representation 529' onto a surface of one or more of the entities or objects (in this example, 513) using photogrammetry with a direct fire or dispensing system output application. In the fourth section of FIG. 10, an indirect fire or product application current or predicted IP 529" is integrated and projected to conform onto one or more of the entities or object wire frame models (e.g. in this example, 511) showing a visual indication of an area on the entities or objects (e.g. 511) affected by an indirect fire or dispensing system application (e.g. a mortar shell, fragmentation grenade, air drop from a firefighting aircraft of fire retardant or firefighting substance, painting system, or other dispensed product applied using an indirect path such as a ballistic path). In this example, the IP area 529" shows a footprint where the dispensed product creates an effect on the wire frame object or entity's surface.

The invention claimed is:

1. An augmented reality (AR) system comprising:
a head mounted display (HMD) comprising a visual display system and a head mounting structure adapted to fix the HMD with respect to a human operator's field of view (FOV), and a camera system oriented towards said FOV configured to capture a plurality of video images of entities, elements or objects within the FOV;
a plurality of sensors comprising a head mounted position sensor and a first position sensor receiver positioned on a first device, said plurality of sensors comprising one or more inertial navigation units (INU) or an inertial measuring unit (IMU), said INU comprising a plurality of accelerometers, said IMU comprising an INU and a global position system (GPS) configured to determine a location of the GPS system, wherein said INU and IMU are configured to determine an orientation of at least a first device and each said sensor is coupled with an output of said location as an orientation data;
a laser rangefinder mounted to said first device used to measure distance between projectile launcher and impact point, or moving object and intended flight path;
a control system comprising a storage medium comprising a plurality of machine readable instructions operable to control elements of said AR system, a processor adapted to execute said plurality of machine readable instructions, said control system is configured to control said AR system, said sensors, and said HMD;
a communication system configured to couple said HMD, said sensors, and said control system, said communication system is further configured to transmit electronic data between said HMD and a remote source using a radio frequency system or a laser data transfer system;
wherein said plurality of machine readable instructions comprises:
a first plurality of instructions configured to operate laser range-finder and ballistic trajectory calculation system as well as an impact point determination system based on at least a first, second, and third data associated with at least one said first device, wherein said first data comprises an aim point of said first device, said second data comprises a computed impact point of a projectile fired from said first device, said third data comprises a path of travel of said projectile from a point of origin from said first device to said impact point, wherein said first, second and third data each comprise one or more geo-reference system position coordinates;
a second plurality of instructions configured to control said processor to operate said plurality of sensors to generate data used by said control system to determine three dimensional orientations of each of said sensors based determinations of location of the devices relative to at least the head mounted position system (HMPS) and said device mounted position sensor;
a third plurality of instructions configured to operate a video processing system to determine and create a wire frame model data of objects within the FOV based on the plurality of video images captured by the camera system, using a photogrammetry processing system a fourth plurality of instructions configured to control said processor to operate said HMD to generate and display on said HMD a plurality of AR visualizations comprising a first visualization within said FOV of said operator comprising at least a first, second, third, and fourth visualization element, wherein said first and second visualization elements are generated based on a first, second, and third plurality of instructions outputs, said first visualization element comprises a visual designator showing said aim point on a surface defined by said wire frame model data, said impact point on said wire frame model data, or said path of travel with respect to at least a portion of said wire frame model data, said second visualization element comprises a visual damage overlay displaying a predicted blast radius associated with a projectile fired from first device, said third visualization element comprises a visual overlay highlighting or designating of a plurality of entities, elements or objects, said fourth visualization element comprises a plurality of metadata associated with said plurality of entities, elements or objects highlighted or designated by said third plurality element; and a fifth plurality of instructions configured to provide a graphical user interface (GUI) control interfaces enables said operator to select and control one or more of said plurality of visualization elements, wherein a cursor control software module generates and displays a cursor on said HMD, wherein said operator is able to manipulate said cursor to interact with said plurality of visualization elements.

2. The AR system of claim 1, wherein said point of origin is a muzzle of a projectile launching system.

3. The AR system of claim 1, wherein the AR system further comprises of an augmented reality glove, wherein said AR glove is a wearable device worn on an operator's hand comprising of a plurality of sensors configured to generate a plurality of cursor control instructions based on a plurality of specific motions of said AR glove, wherein said AR glove is coupled with said communication system to transmit said plurality of cursor control instructions from the AR glove to said cursor control software module which generates and displays the movement of said cursor correlating to said plurality of specific motions of said AR glove.

4. The AR system of claim 1, wherein said laser rangefinder and ballistic trajectory calculation system adjust the aim point, impact point and path of travel based on a plurality of weather data obtained from a local source or a remote source using said communication system.

5. The AR system of claim 1, wherein said communication system configured to couple elements of the AR system transmit signals wirelessly or wired.

6. The AR system of claim 1, wherein said fourth visualization elements are generated and displayed on the HMD include detailed descriptions, accuracy of object recognition, or any other pertinent information associated with identified entities, elements or objects whenever said identified entities, elements or objects are within the FOV of the HMD.

7. The AR system of claim 1, wherein said fifth plurality of instructions enables the operator to select a single entity, element, or object from a plurality of entities, elements or objects within the FOV of the HMD to distinguish said entity, element, or object using said third visualization element, and display pertinent information associated with said single entity, element, or object using said fourth visualization element, wherein a single entity comprises a particular individual within a crowd.

8. The AR system of claim 1, wherein said third visualization element further comprises a shape recognition software system that enables distinguishing, identifying, and tracking a plurality of entities, elements, or objects.

9. The AR system of claim 1, wherein said first, second, third and fourth visualization elements are either stored on said storage medium within said control system or remotely transmitted from a remote source to the HMD using the communication system.

10. A process for operating an augmented reality control system comprising:

operating a laser rangefinder and ballistic trajectory calculation system comprising computing ballistic trajectory and impact point of a projectile or moving object based on a first, second, third, and fourth ballistic solution data, wherein said first ballistic solution data comprises a laser range finder output, said second ballistic solution data comprises a weather data associated with an environment a projectile launcher or moving object is operating within, said third ballistic solution data comprises a weapon angle data obtained from a position sensor mounted on the projectile launcher or moving object, said fourth ballistic solution data comprises a ballistic or flight performance characteristics of said projectiles or moving objects;

operating a position tracker system comprising of measuring a relative position between a projectile launcher's launch axis or a moving object's flight orientation with respect to a three axis frame of reference and a HMD camera's or a set of HMD camera's field of view (FOV) orientation with respect to the three axis frame of reference based on a first and second plurality of outputs respectively from a plurality of position tracking nodes comprising a first and second position sensor respectively mounted on said HMD and said projectile launcher or moving object;

executing a photogrammetry process comprising using the HMD camera or set of HMD cameras mounted on the HMD to capture a plurality of images to create a wire frame model data structure to compute offset measurements of a plurality of objects within said plurality of images by using geometric triangulation computations to determine distances between said plurality of objects and calculating range by determining angle offset between said plurality of objects from at least two said plurality of images, wherein the range and distance data are saved into a wire frame model object entities data structure;

generating visual overlays for display over a HMD FOV comprising receiving inputs from said laser rangefinder and ballistic trajectory calculation process, said position tracker process, and said photogrammetry processes and computing parallax for a line of sight within said HMD FOV versus the point of impact, calculating the impact within the wire frame model data structure, generating shaped overlays including occlusions based on the wire frame model data structure, and outputting generated said video overlays to said HMD that are positioned and aligned with said HMD FOV; and projecting the video overlays on said HMD.

11. A method as in claim 10, wherein said first and second position sensors each comprise a three axis inertial navigation unit (INU).

12. A method as in claim 10, wherein said operating the laser rangefinder further comprises lasing a target with said laser rangefinder and calculating a range based on travel time of a laser range finder output.

13. A method as in claim 10, wherein said position tracker system further comprises interrogating said plurality of position tracking nodes, reading signal strength for said plurality of position tracking nodes, calculating a relative node position by triangulation based on differences of signal strength between plurality of position tracking nodes.

14. A method as in claim 10, wherein a damage overlay is generated based on the shaped overlay, wherein the shaped overlay is formed based on the predicted blast radius of an ammunition associated with said fourth ballistic solution data, wherein said fourth ballistic solution data further comprises of a plurality of ammunition data.

* * * * *